United States Patent [19]
Shioji

[11] Patent Number: 5,763,855
[45] Date of Patent: Jun. 9, 1998

[54] METHOD AND APPARATUS FOR SUPPLYING GASEOUS NITROGEN TO A LASER BEAM MACHINE

[75] Inventor: Naruaki Shioji, Ebina, Japan

[73] Assignee: Amada Company, Limited, Kanagawa, Japan

[21] Appl. No.: 578,543

[22] PCT Filed: Jun. 2, 1995

[86] PCT No.: PCT/JP95/01090

§ 371 Date: Jan. 23, 1996

§ 102(e) Date: Jan. 23, 1996

[87] PCT Pub. No.: WO95/33594

PCT Pub. Date: Dec. 14, 1995

[30] Foreign Application Priority Data

Jun. 6, 1994 [JP] Japan ............... 6-123546
Jun. 7, 1994 [JP] Japan ............... 6-125140

[51] Int. Cl.[6] .................................................. B23K 26/14
[52] U.S. Cl. ........................... 219/121.84; 219/121.6
[58] Field of Search ................ 219/121.6, 121.63, 219/121.67, 121.84, 121.85, 121.78; 372/59; 55/385.1; 95/54; 137/3, 99, 545, 595, 601

[56] References Cited

U.S. PATENT DOCUMENTS

| | | | |
|---|---|---|---|
| 4,945,207 | 7/1990 | Arai | 219/121.84 |
| 4,977,566 | 12/1990 | Herbst et al. | |
| 5,334,816 | 8/1994 | Sugiyama | 219/121.84 |
| 5,374,803 | 12/1994 | Yamada | 219/121.67 |
| 5,539,180 | 7/1996 | Mori et al. | 219/121.84 |
| 5,559,584 | 9/1996 | Miyaji et al. | 355/73 |

FOREIGN PATENT DOCUMENTS

| | | | |
|---|---|---|---|
| 0148405 | 7/1985 | European Pat. Off. | |
| 3906571 | 9/1990 | Germany | |
| 59-215292 | 12/1984 | Japan | 219/121.84 |
| 60-121097 | 6/1985 | Japan | 219/121.84 |
| 63-299884 | 12/1988 | Japan | 219/121.84 |
| 2-15895 | 1/1990 | Japan | 219/121.84 |
| 5-84590 | 4/1993 | Japan | |
| 5-185267 | 7/1993 | Japan | 219/121.84 |

OTHER PUBLICATIONS

Patent Abstracts of Japan, vol. 17, No. 410 (M-1455), and JP-A-05 084590.

*Primary Examiner*—Teresa J. Walberg
*Assistant Examiner*—Gregory L. Mills
*Attorney, Agent, or Firm*—Greenblum & Bernstein P.L.C.

[57] ABSTRACT

Oxygen and nitrogen contained in air is separated by an air separator. The separated nitrogen gas is supplied to an optical path cover of a laser beam machine as a protective gas for bend mirrors. Further, the separated nitrogen gas or oxygen gas can be selectively supplied to a laser beam head as an assist gas. The purity of the separated nitrogen gas can be kept within a predetermined range (94 to 99.5%) on the basis of a difference in pressure between a first conduit for supplying nitrogen gas and a second conduit for supplying oxygen gas. It is preferable to provide a filter for removing dust from air supplied to the air separator and a second filter for removing oil mist from the separated nitrogen supplied to the optical path cover.

8 Claims, 4 Drawing Sheets

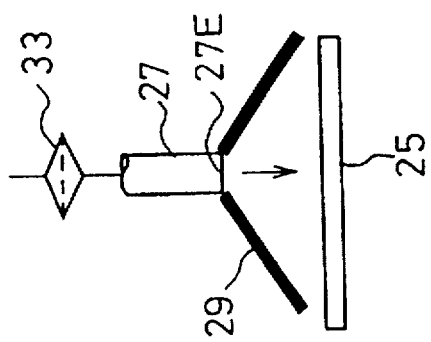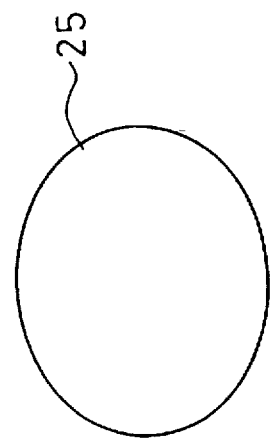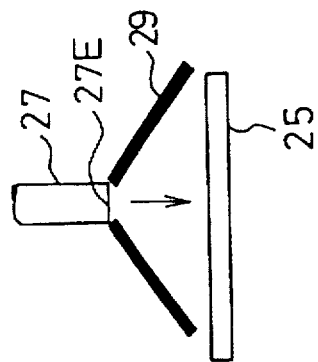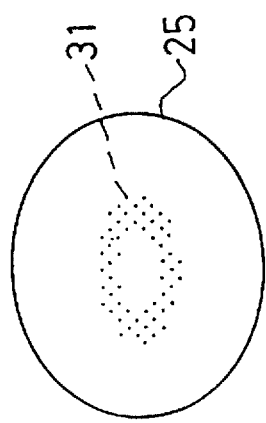
FIG.2A FIG.2B

METHOD AND APPARATUS FOR SUPPLYING GASEOUS NITROGEN TO A LASER BEAM MACHINE

BACKGROUND OF THE INVENTION

1. Field of the Invention

The present invention is related to a method and apparatus for supplying nitrogen gas to an optical path system of a laser beam machine, and to a laser head provided for the same. Nitrogen gas is supplied to an optical path system to protect bend mirrors arranged in the optical path system, and further to a laser beam head as an assist gas.

2. Description of Background Information

As is well known, a laser beam machine is provided with a laser beam oscillator and a laser beam head. Further, a plurality of bend mirrors are arranged between the laser beam oscillator and the laser beam head, to guide the laser beam generated by the laser beam oscillator to the laser beam head.

The laser beam path from the laser beam oscillator to the laser beam head is referred to as an optical path system, and is usually partitioned from outside air by a pipe member, for safety purposes and for protection of the optical path system from dust.

Further, in known laser beam machines having a movable laser beam head, since the optical path length from the laser beam oscillator to the laser beam head changes, both are connected by use of a bellows or a telescopic tube, etc.

In order to prevent outside air from entering the optical path system in this type of system, dry air cleaned by an air drying unit is usually supplied into the optical path system to protect various optical elements such as bend mirrors, lenses, etc.

Since the dry and clean air is supplied into the optical path system for prevention of outside air from entering the optical path system, dust levels are kept extremely low, compared with the outside air. However, there exists a problem in that the optical elements deteriorate more rapidly due to exposure to and/or very small amounts of moisture contained in the dry and clean air, when the laser beam machine has been used for many hours.

In addition, an assist gas such as air, oxygen, nitrogen, argon, etc. is usually used in the laser beam machines. The appropriate assist gas is selected according to the sort of plate materials, laser beam machining conditions, etc.

However, air, oxygen and nitrogen are generally chosen as the assist gases, because argon is costly (except the case where the material to be processed is titanium).

In the case where air is used as the assist gas, a compressed air can be obtained easily by use of a compressor. In the case of oxygen or nitrogen, however, an oxygen bomb or a nitrogen bomb must be prepared, so that the assist gas is not economical.

To overcome these problems, Japanese Published Unexamined (Kokai) Patent No. 5-84590 (referred to as a prior art, hereinafter) discloses such a construction that oxygen and nitrogen in air are separated from each other by an air separator so that the separated oxygen and nitrogen can be used as the assist gas. In this method, since oxygen and nitrogen in air can be used after separation without using any gas bombs, the assist gas can be obtained at a relatively low cost.

In the above-mentioned method, however, since the pressure of the assist gas supplied to the laser beam head must be adjusted according to the laser beam machining conditions, there exists another problem in that the purity of oxygen or nitrogen separated by the air separator varies whenever the assist gas pressure is adjusted. This results in the potential that a harmful influence will be produced upon the laser beam processing, if the purity of the assist gas varies out of a normally acceptable range.

SUMMARY OF THE INVENTION

With these problems in mind, therefore, it is an object of the present invention to provide a method and apparatus for protecting the optical path system more reliably from deterioration (due to oxidation, moisture, etc.).

Another object of the present invention is to effectively use separated nitrogen as an assist gas and an optical path system protective gas simultaneously.

A further object of the present invention is to supply separated nitrogen gas as an assist gas within a constant purity range (94 to 99.5%), even when the assist gas pressure is adjusted according to the laser beam processing conditions.

To achieve the above-mentioned objects, the present invention provides a method of supplying nitrogen gas into an optical path system of a laser beam machine. The method includes: supplying compressed air into an air separator for separating oxygen and nitrogen from the supplied compressed air; and introducing nitrogen-rich gas separated by the air separator into an optical path cover of an optical path system of a laser beam machine, to maintain an inner pressure of the optical path cover at a pressure higher than outside air pressure.

Further, it is preferable that the method comprises passing the nitrogen-rich gas separated by the air separator through a filter for removing oil mist, before the nitrogen-rich gas is introduced into the optical path cover of the optical path system of the laser beam machine.

The present invention further provides an apparatus for supplying nitrogen gas into an optical path system of a laser beam machine. The apparatus includes an air separator for separating oxygen and nitrogen from compressed air; and conduit means for introducing nitrogen-rich gas separated by the air separator into an optical path cover of the optical path system of the laser beam machine.

Further, it is preferable that the apparatus also includes a first filter for removing dust from the compressed air, before the compressed air is supplied to the air separator; and a second filter for removing oil mist contained in the nitrogen-rich gas, before the nitrogen-rich gas is introduced into the optical path cover of the optical path system of the laser beam machine.

Further, the present invention provides a laser beam machine, comprising an air separator for separating oxygen and nitrogen from compressed air; first conduit means for introducing nitrogen-rich gas separated by the air separator into an optical path cover of the laser beam machine as a protective gas; and second conduit means for introducing the nitrogen-rich gas separated by the air separator into a laser beam head of the laser beam machine as an assist gas.

Still further, it is preferable that the laser beam machine includes a first filter for removing dust from the compressed air, before the compressed air is supplied to the air separator and a second filter disposed in the first conduit means, for removing oil mist contained in the nitrogen-rich gas, before the nitrogen-rich gas is introduced into the optical path cover of the laser beam machine.

The second conduit means, preferably comprises a conduit connected between the optical path cover and the laser beam head, for supplying the nitrogen-rich gas into the laser beam head as the assist gas.

Preferably, the second conduit means comprises a branch conduit connected between the air separator and the laser beam head, for supplying the nitrogen-rich gas into the laser beam head as the assist gas.

Still further, the second conduit means comprises a first conduit connected between a first outlet port of the air separator, for discharging the nitrogen-rich gas; and a second conduit connected between a second outlet port of the air separator, for discharging the oxygen-rich gas.

It is preferable that the laser beam machine includes a first change-over valve disposed midway of the first conduit, for supplying the nitrogen-rich gas into the laser beam head when opened; and a second change-over valve disposed midway of the second conduit, for supplying the oxygen-rich gas into the laser beam head when opened.

It is further preferable that the laser beam machine includes a first pressure control valve disposed midway of the first conduit, for controlling pressure in the first conduit; and a second pressure control valve disposed midway of the second conduit, for controlling pressure in the second conduit.

Purity of the nitrogen-rich gas increases when the pressure in the first conduit is increased by the first pressure control valve, but decreases when the pressure therein is decreased thereby.

Alternatively, purity of the nitrogen-rich gas increases when the pressure in the first conduit is kept constant by the first pressure control valve and when the pressure in the second conduit is decreased by the second pressure control valve, but decreases when the pressure in the first conduit is kept constant by the first pressure control valve and when the pressure in the second conduit is increased by the second pressure control valve.

Purity of the nitrogen-rich gas can be kept roughly (substantially) constant when a difference in pressure between the first and second conduits is kept roughly (substantially) constant.

Preferably, the laser beam machine further includes: a first control valve for remotely controlling the first pressure control valve; and a second control valve for remotely controlling the second pressure control valve.

Further, the laser beam machine preferably comprises a link mechanism for controlling the first and second pressure control valves simultaneously in linkage so that a difference in pressure between the first and second conduits can be kept substantially constant.

In the laser beam machine according to the present invention, since the nitrogen-rich gas containing an extremely small amount of oxygen and moisture is supplied into the optical path system at a pressure higher than the atmospheric pressure, it is possible to effectively prevent fire accidents in the optical path system and to protect the optical parts from deterioration due to oxidation and moisture, as compared with the conventional dry air.

Further, in the laser beam machine according to the present invention, since the nitrogen-rich gas can be also supplied to the laser beam head as an assist gas, it is possible to effectively use the nitrogen-rich gas separated by the air separator. Oxygen gas separated by the air separator can be also used as an assist gas.

Since, the nitrogen-rich gas can be supplied to the laser beam head as an assist gas by keeping the purity of the nitrogen-rich gas or the oxygen-rich gas at a desired constant level or in a predetermined range (e.g., 94 to 99.5%) at all times, it is possible to prevent the occurrence of dross during the laser beam processing.

Further, since the first filter removes dust from air supplied to the air separator and the second filter removes oil mist from the separated nitrogen supplied to the optical path cover, it is possible to improve the lifetime of the optical parts of the optical path system.

BRIEF DESCRIPTION OF THE DRAWINGS

FIGS. 2A and 2B are illustrations for assistance in explaining the oil mist adhesion test method and the test results, respectively;

DETAILED DESCRIPTION OF THE PREFERRED EMBODIMENTS

Embodiments of the laser beam machine according to the present invention will be described hereinbelow with reference to the attached drawings.

Figure 1:
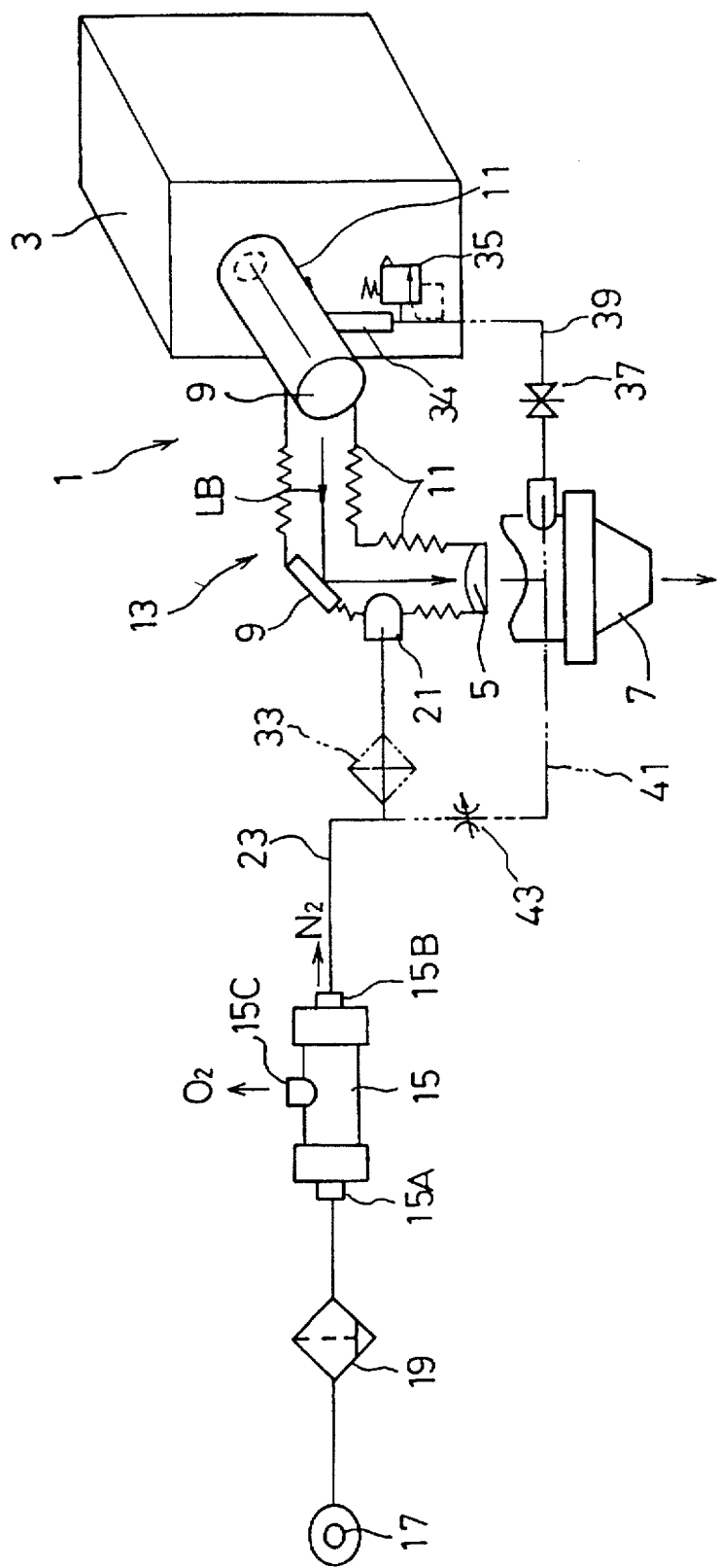
FIG. 1 is a schematic illustration showing a first embodiment of the laser beam machine according to the present invention.

In FIG. 1, the laser beam machine 1 is provided with a laser beam oscillator 3 and a laser beam head 7 having a condenser lens 5. The laser beam oscillator 3 is connected to the laser beam head 7 via an optical path system 13 composed of a plurality of bend mirrors 9 and an optical cover 11. The bend mirrors 9 guide a laser beam LB generated by the laser beam oscillator 3 to the laser beam head 7. The optical cover 11 is an appropriate pipe member, bellows, telescopic tube, etc. Further, the optical path system 13 is the same as with the case of the prior art one, so that any detailed description thereof is omitted herein.

Additionally, an air separator 15 is provided to separate oxygen and nitrogen from compressed air. The separated nitrogen-rich gas is supplied into the optical path cover 11 to protect the optical path system 13. The air separator 15 is a module in which a great number of hollow threads (e.g., formed of polyimide) are arranged in a lump within a vessel. The hollow polyimide thread membrane is more permeable to oxygen than to nitrogen.

Therefore, when compressed air is supplied into the air separator 15 through an inlet port 15A and flows through the hollow threads, oxygen, moisture and oil mist of the compressed air are selectively passed through the membranes of the polyimide hollow threads. Thus, it is possible to obtain a nitrogen-rich gas (purity: 94 to 99.5%) from a first outlet port 15B. On the other hand, the permeated oxygen, moisture and oil mist are discharged through a second outlet port 15C as oxygen-rich gas. The above-mentioned nitrogen-rich gas (obtained by removing oxygen, moisture and oil mist from air) is dry air (nitrogen) having a dew point of about −50 degrees under atmospheric pressure. The comparison with the ordinary refrigerator drier having a dew point of about −10 degrees under atmospheric pressure, it can be understood that the nitrogen-rich gas is extremely advantageous when used to protect the optical path system 13.

To supply compressed air into the air separator 15, a pressure source 17, such as a compressor, is provided.

Further, a filter 19 is connected between the pressure source 17 and the inlet port 15A of the air separator 15, to remove dust and oil mist contained in the high pressurized air supplied by the pressure source 17.

A conduit (pipe) 23 is connected between the first outlet port 15B of the air separator 15 and a junction port 21 of the optical path cover 11, to supply the nitrogen-rich gas separated from the compressed air by the air separator 15 into the optical path cover 11 of the optical path system 13. The second outlet port 15C of the air separator 15 is open to the atmospheric pressure.

In the above-mentioned construction, after having been passed through the filter 19 for removal of dust and oil mist, the compressed air of the pressure source 17 is supplied to the air separator 15 through the inlet port 15A. The compressed air supplied into the air separator 15 through the inlet port 15A is separated into oxygen (containing moisture, residual oil mist (passed through the filter 19)) and nitrogen when it passes through the hollow thread membranes. As a result, it is possible to obtain nitrogen-rich gas (purity: 94 to 99.5%) through the first outlet port 15B and the oxygen-rich gas passed through the second outlet port 15C of the air separator 15, respectively.

Since, as noted previously, the nitrogen-rich gas is dry air having a dew point of about −50 degrees under atmospheric pressure, when the nitrogen-rich gas is supplied into the optical path cover 11 of the optical path system 13 through the conduit 23, it is possible to maintain the pressure within the optical path cover 11 higher than the atmospheric pressure.

In other words, since the optical cover 11 is kept at a pressure higher than the atmospheric pressure and further filled with nitrogen-rich dry air containing extremely small contents of oxygen (nitrogen purity: 94 to 99.5%), it is possible to protect the optical cover 11 from fire accidents as well as to protect the optical parts (e.g., the bend mirrors 9) from deterioration (e.g., due to oxidation or moisture) more effectively.

In addition to introducing the nitrogen-rich gas into the optical path cover 11 for protection of the optical path system 13, as described above, it is also possible to direct the dry air against the bend mirrors 9 to clean the surfaces of the bend mirrors 9. To check the effectiveness of the direct jetting of the dry air against the bend mirrors 9 for surface cleaning, the following tests were made:

As shown in FIG. 2 (A), a test conduit 27 was connected to the first outlet port 15B of the air separator 15, in place of the conduit 23. A test mirror 25 was held in the air at a distance of about 55 mm away from an end 27E of the test conduit 27. A conical cover 29 was attached near the end of the test conduit 27 for prevention of the introduction of external air.

In the above-mentioned construction, nitrogen-rich gas was directly jetted against the test mirror 25. In this test, some oil mist 31 was observed to adhere to the surface of the test mirror 25 after about six hours.

The above-mentioned test indicates that the nitrogen-rich gas still contains a small amount of oil mist. Therefore, when the nitrogen-rich gas is directly jetted against the bend mirrors 9 to clean the surfaced thereof, although the bend mirrors 9 are not degraded in a short time, there exists a possibility that the bend mirrors 9 deteriorate after longer periods of use (e.g., several hours or more).

To overcome the above-mentioned problem, as shown in FIG. 2(B), a filter 33 having active carbon (charcoal) was connected midway to the test conduit 27, and a similar test was made. In this case, it was observed that no oil mist adhered to the surface of the test mirror 25 even after 400 hours. The above-mentioned test indicates that it is extremely effective to remove oil mist through the use of a filter 33 having active carbon.

Accordingly, in the laser beam machine as shown in FIG. 1, it is desirable to connect an active carbon filter 33 to the conduit 23, in order to positively remove the small amount of oil mist which still remains in the nitrogen-rich gas.

It is also possible to interpose the active carbon filter 33 between the filter 19 and the inlet port 15A of the air separator 15. In this case, however, since the entire volume of compressed air supplied to the air separator 15 must be filtered, it is preferable to interpose the filter 33 on the side of the conduit 23 to increase the useable lifetime of the filter 33.

The pressure within the optical path cover 11 of the optical system 13 is kept higher than the atmospheric (outside air) pressure. It is possible to construct the optical path cover 11 in such a way that part of the supplied nitrogen-rich gas can be discharged to the outside through an appropriate gap formed between the connection portions of some elements of the optical path cover 11. Thus, in this embodiment, in order to maintain the pressure within the optical path cover 11 under a stable constant value, a discharge port 34 is formed at a position of the optical path cover 11, and further, a relief valve 35 is connected to this discharge port 34.

Consequently, the inner pressure within the optical path cover 11 can be maintained at a substantially constant level through the relief valve 35, even if the volume of the optical path cover 11 is decreased or increased and thereby the inner pressure thereof is increased or decreased, for example, when the laser beam head 7 is moved. Therefore, it is possible to prevent the bend mirrors 9 from being distorted by fluctuations in inner pressure.

In order to use the nitrogen-rich gas as an assist gas, as well as a protective gas for the optical path system 13, the discharge port 34 of the optical path cover 11 can be connected to the laser beam head 7 through a conduit 39 having a shut-off valve 37 connected midway thereof. In other words, it is possible to use the nitrogen-rich gas in the optical path cover 11 as an assist gas at need. In this way, the nitrogen-rich gas can be used more effectively.

Further, it is also possible to connect a branch pipe 41 having a throttle valve 43 between the conduit 23 and the laser beam head 7, so that the nitrogen-rich gas can be directly supplied into the laser beam head 7 as an assist gas. In this case, as far as the amount of the nitrogen-rich gas within the conduit 23 is sufficient, it is possible to use the nitrogen-rich gas as the assist gas, without exerting a harmful influence upon the pressure within the optical path cover 11.

A second embodiment of the laser beam machine will be described hereinbelow with reference to FIG. 3. In this embodiment, the nitrogen-rich gas can be supplied to the laser beam head as the assist gas under a stable pressure condition.

Figure 3:
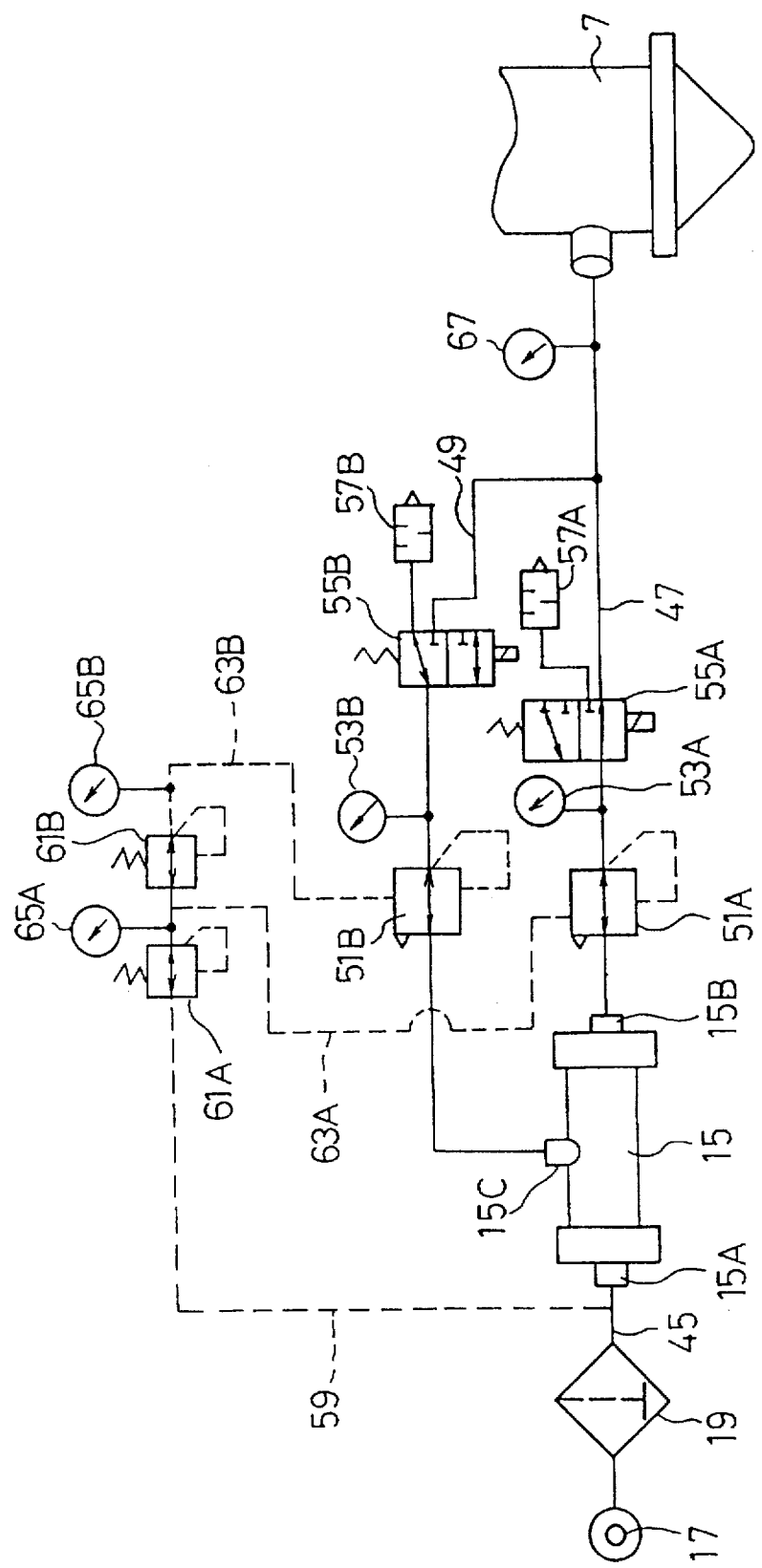
FIG. 3 is a schematic illustration showing a second embodiment of the laser beam machine according to the present invention.

In FIG. 3, an air separator 15 is provided to separate oxygen and nitrogen from compressed air. The structure of the air separator 15 is quite the same in structure as with the case of the first embodiment. That is, the air separator 15 is a module in which a great number of hollow threads (e.g., formed of polyimide) are arranged in a lump in a vessel. The hollow polyimide thread membranes are more permeable to oxygen than to nitrogen, both of which are contained in air.

Therefore, when compressed air is supplied into the air separator 15 through an inlet port 15A and flows through the hollow threads, oxygen, moisture and oil mist of the compressed air are selectively passed through the membranes of the polyimide hollow threads. As a result, it is possible to obtain a nitrogen-rich gas (purity: 94 to 99.5%) from a first outlet port 15B. On the other hand, the permeated oxygen, moisture and oil mist are discharged through a second outlet port 15C as oxygen-rich gas. The above-mentioned nitrogen-rich gas (obtained by removing oxygen, moisture and oil mist from air) is dry air (nitrogen) having a dew point of about −50 degrees under atmospheric pressure.

A pressure source 17 such as a compressor is provided to supply compressed air into the air separator 15. Further, a filter 19 is connected between the pressure source 17 and the inlet port 15A of the air separator 15 for removal of dust and oil mist contained in the highly pressurized air provided by the pressure source 17.

In FIG. 3, a first conduit 47 is connected between a first outlet port 15B of the air separator 15 and the laser beam head 7 of the laser beam machine. A first pressure control valve 51A, a first pressure gauge 53A and a first change-over (selector) valve 55A are connected midway of the first conduit 47 in sequence. In addition, a muffler (noise eliminator) 57A is connected to the first change-over valve 55A.

In order to remotely control the first pressure control valve 51A, a pilot path 59 is branched from a connection pipe 45 (connected between the filter 19 and the air separator 15). A first pilot control valve 61A is connected to the pilot path 59. The first pilot control valve 63A is connected to the first pressure control valve 51A. Further, a third pressure gauge 65A is connected to the pilot path 63A.

A second conduit 49 is connected between a second outlet port 15C of the air separator 15 and the laser beam head 7 of the laser beam machine. A second pressure control valve 51B, a second pressure gage 53B and a second change-over (selector) valve 55B are connected midway of the second conduit 49 in sequence. In addition, a muffler (noise eliminator) 57B is connected to the second change-over valve 55B.

In order to remotely control the second pressure control valve 51B, a second pilot control valve 61B is connected to the first pilot control valve 61A. A second pilot path 63B is connected between the second pilot control valve 61A and the second pressure control valve 51B. Further, a fourth pressure gauge 65B is connected to the second pilot path 63B.

A pressure gauge 67 is connected to the first conduit 47 to display the pressure of the assist gas supplied into the laser beam head 7.

In the above-mentioned construction, when the compressed air of the pressure source 17 is supplied to the air separator 15 through the inlet port 15A via the filter 19, since nitrogen and oxygen are separated from the supplied compressed air, nitrogen-rich gas (purity: 94 to 99.5%) is discharged through the first outlet port 15B and the oxygen-rich gas (passed through the polyimide hollow thread membranes) is discharged through the second outlet port 15C of the air separator 15, respectively.

Under these conditions, when the first change-over valve 55A is switched to an open state and the second change-over valve 55B is switched to a closed state, the separated nitrogen-rich gas is supplied to the laser beam head 7 as an assist gas, and the separated oxygen-rich gas is discharged to the outside through the muffler 57B.

On the other hand, when the first change-over valve 55A is switched to a closed state and the second change-over valve 55B is switched to an open state, the separated oxygen-rich gas is supplied to the laser beam head 7 as an assist gas, and the separated nitrogen-rich gas is discharged to the outside through the muffler 57A. Thus, it is possible to selectively supply nitrogen-rich gas or oxygen-rich gas into the laser beam head 7 as an assist gas according to the laser beam processing conditions.

The pressure of the nitrogen-rich gas supplied to the laser beam head 7 can be controlled on the basis of the set pressure of the first pressure control valve 51A, which can be controlled by the first pilot control valve 61A. In the same way, the pressure of the oxygen-rich gas supplied to the laser beam head 7 can be controlled on the basis of the set pressure of the second pressure control valve 51B, which can be controlled by the second pilot control valve 61B.

For example, when the first pressure control valve 51A is throttled down (the opening is reduced), the volume of the nitrogen-rich gas flowing therethrough decreases, and the amount of the oxygen-rich gas (passed through the hollow thread membranes) increase. Thus, the purity of the nitrogen-rich gas discharged through the first outlet port 15B increases. In contrast, when the first pressure control valve 51A is throttled up (the opening is increased), the amount of gas being discharged increases on the side of the first outlet port 15B, and the amount of the oxygen being discharged through the first outlet port 15B increases, so that the purity of the nitrogen-rich gas discharged through the first outlet port 15B decreases.

When the second pressure control valve 51B is throttled down on condition that the first pressure control valve 51A is kept at constant throttle rate (the set pressure is kept constant), the gas dischargeability decreases on the side of the second outlet port 15C, and therefore the amount of oxygen discharged through the first outlet port 15B increases, so that the purity of the nitrogen-rich gas discharged through the first outlet port 15B decreases.

On the other hand, when the second pressure control valve 51B is throttled up on condition that the first pressure control valve 51A is kept at a constant throttle rate (the set pressure is kept constant), the gas dischargeability increases on the side of the second outlet port 15C, and the amount of the oxygen discharged from the first outlet port 15C increases, so that the purity of the nitrogen-rich gas discharged from the first outlet port 15B increases.

As described above, it is possible to keep the purity of the nitrogen-rich gas discharged through the first outlet port 15B of the air separator 15 at any desired value by maintaining a difference in pressure between the first and second conduits 47 and 49 at roughly a constant value.

During laser beam machining, when the purity of the nitrogen-rich gas obtained through the first outlet port 15B of the air separator 15 becomes less than 94%, dress adheres onto cut-off stainless plate material, for instance. Therefore, in order to cut stainless material, for example, by laser beam cutting processing without producing any dross, it is necessary to keep the purity of the nitrogen-rich gas supplied into the laser beam head 7 at 94% or higher.

In the second embodiment, when the first pilot control valve 61A is operated to change the set value of the first pressure control valve 51A so that the pressure of the nitrogen-rich gas supplied to the laser beam head 7 can be changed according to the machining conditions, a difference in inner pressure between the first conduit 47 and the second conduit 49 changes.

Further, when the second pilot control valve 61B is operated to change the set value of the second pressure control valve 51B, it is possible to set the pressure difference to any desired value, with the result that it is possible to keep the purity of the nitrogen-rich gas supplied from the air separator 15 to the laser beam head 7 at a predetermined value without producing dross during the cut-off processing of the stainless material, for instance.

Thus, even if various pressures of the assist gas are required according to the laser beam processing conditions, it is possible to suppress the fluctuations in purity of the nitrogen-rich gas supplied to the laser beam 7, and to control the purity of the nitrogen-rich gas at roughly a constant level.

Although the first and second pressure control valves 51A and 51B are adjusted, respectively by operating the first and second pilot control valves 61A and 61B, separately in this embodiment, it is also possible to control the first and second pressure control valves 51A and 51B by use of two electromagnetic pressure reduction valves, respectively.

Figure 4:
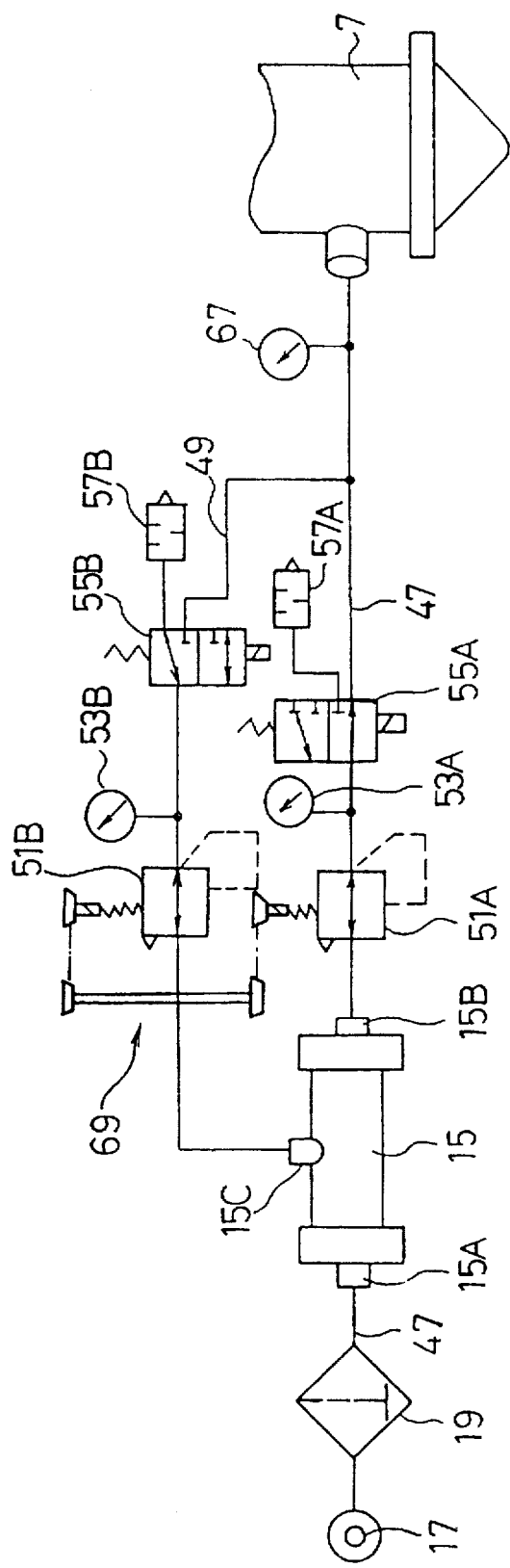
FIG. 4 is a schematic illustration showing a third embodiment of the laser beam machine according to the present invention.

A third embodiment of the laser beam machine will be described hereinbelow with reference to FIG. 4. In this embodiment, the first and second pressure control valves 51A and 51B are both operated by use of a link mechanism 69, such as a gear or chain link mechanism, for example. When one of the two pressure control valves 51A and 51B is operated, the other of the pressure control valves 51A and 51B is thereby operated simultaneously in linkage with the one. In this linkage operation, the first and second pressure control valves 51A and 51B are so linked that a difference in inner pressures between the first conduit 47 and the second conduit 49 can be always maintained at a substantially constant value.

The above-mentioned embodiments have been explained by way of examples. Without being limited only thereto, however, the embodiments can be modified in various ways. For instance, each of the first and second pressure control valves can be placed with two flow rate control valves having an adjustable throttle, an adjust valve, etc., respectively. Further, the two change-over valves 55A and 55B can be assembled into a single change-over valve.

Also, when the laser beam machining conditions are roughly constant and therefore only the nitrogen-rich gas is used as an assist gas, it is possible to control the pressure of the nitrogen-rich gas supplied to the laser beam head 7 by use of only the first pressure control valve 51A arranged in the first conduit 47. In this case, the second outlet port 15C of the air separator 15 is left released to the atmospheric pressure. However, since it is preferable that the purity of the nitrogen-rich gas supplied to the laser beam head 7 is kept at 94% or higher, the first control valve 51A is controlled in such a way that a pressure difference between the first output port 15B and the second outlet port 15C can be maintained within a predetermined desired range.

I claim:

1. A laser beam machine including a laser for generating a laser beam, comprising:

a laser beam head;

an optical path cover through which said laser beam passes from said laser to said laser beam head;

a compressed air supply for supplying compressed air;

an air separator for separating oxygen and nitrogen from said compressed air;

first conduit means for introducing nitrogen-rich gas separated by said air separator into said optical path cover of the laser beam machine as a protective gas; and second conduit means for introducing the nitrogen-rich gas separated by said air separator into said laser beam head of the laser beam machine as an assist gas, said second conduit means including a first conduit for discharging the nitrogen-rich gas, connected between a first outlet port of said air separator and said laser beam head, and a second conduit for discharging the oxygen-rich gas, connected between a second outlet port of said air separator and said laser beam head;

a first change-over valve disposed midway of said first conduit, for supplying the nitrogen-rich gas into said laser beam head when opened;

a second change-over valve disposed midway of said second conduit, for supplying oxygen-rich gas into said laser beam head when opened;

a first pressure control valve disposed midway of said first conduit, for regulating pressure in said first conduit; and a second pressure control valve disposed midway of said second conduit, for regulating pressure in said second conduit, wherein said second conduit means comprises a conduit connected between said optical path cover and said laser beam head for supplying the nitrogen-rich gas into said laser beam head as the assist gas.

2. A laser beam machine including a laser for generating a laser beam, comprising:

a laser beam head;

an optical path cover through which said laser beam passes from said laser to said laser beam head;

a compressed air supply for supplying compressed air;

an air separator for separating oxygen and nitrogen from said compressed air;

first conduit means for introducing nitrogen-rich gas separated by said air separator into said optical path cover of the laser beam machine as a protective gas; and second conduit means for introducing the nitrogen-rich gas separated by said air separator into said laser beam head of the laser beam machine as an assist gas, said second conduit means including a first conduit for discharging the nitrogen-rich gas, connected between a first outlet port of said air separator and said laser beam head, and a second conduit for discharging the oxygen-rich gas, connected between a second outlet port of said air separator and said laser beam head;

a first change-over valve disposed midway of said first conduit, for supplying the nitrogen-rich gas into said laser beam head when opened;

a second change-over valve disposed midway of said second conduit, for supplying oxygen-rich gas into said laser beam head when opened;

a first pressure control valve disposed midway of said first conduit, for regulating pressure in said first conduit;

a second pressure control valve disposed midway of said second conduit, for regulating pressure in said second conduit; and a control device that substantially constantly maintains the purity of the nitrogen-rich gas by maintaining a substantially constant difference in pressure between said first and second conduits.

3. The laser beam machine according to claim 2, wherein said optical path cover further comprises at least one mirror for reflecting said laser beam, and wherein said dry nitrogen-rich air is directly jetted against said at least one mirror.

4. A laser beam machine including a laser for generating a laser beam, comprising:

a laser beam head;

an optical path cover through which said laser beam passes from said laser to said laser beam head;

a compressed air supply for supplying compressed air;

an air separator for separating oxygen and nitrogen from said compressed air;

first conduit means for introducing nitrogen-rich gas separated by said air separator into said optical path cover of the laser beam machine as a protective gas; and second conduit means for introducing the nitrogen-rich gas separated by said air separator into said laser beam head of the laser beam machine as an assist gas, said second conduit means including a first conduit for discharging the nitrogen-rich gas, connected between a first outlet port of said air separator and said laser beam head, and a second conduit for discharging the oxygen-rich gas, connected between a second outlet port of said air separator and said laser beam head;

a first change-over valve disposed midway of said first conduit, for supplying the nitrogen-rich gas into said laser beam head when opened;

a second change-over valve disposed midway of said second conduit, for supplying oxygen-rich gas into said laser beam head when opened;

a first pressure control valve disposed midway of said first conduit, for regulating pressure in said first conduit;

a second pressure control valve disposed midway of said second conduit, for regulating pressure in said second conduit; and a first control valve associated with said compressed air supply for remotely controlling said first pressure control valve; and a second control valve associated with said compressed air supply for remotely controlling said second pressure control valve.

5. A laser beam machine including a laser for generating a laser beam, comprising:

a laser beam head;

an optical path cover through which said laser beam passes from said laser to said laser beam head;

a compressed air supply for supplying compressed air;

an air separator for separating oxygen and nitrogen from said compressed air;

first conduit means for introducing nitrogen-rich gas separated by said air separator into said optical path cover of the laser beam machine as a protective gas; and second conduit means for introducing the nitrogen-rich gas separated by said air separator into said laser beam head of the laser beam machine as an assist gas, said second conduit means including a first conduit for discharging the nitrogen-rich gas, connected between a first outlet port of said air separator and said laser beam head, and a second conduit for discharging the oxygen-rich gas, connected between a second outlet port of said air separator and said laser beam head;

a first change-over valve disposed midway of said first conduit, for supplying the nitrogen-rich gas into said laser beam head when opened;

a second change-over valve disposed midway of said second conduit, for supplying oxygen-rich gas into said laser beam head when opened;

a first pressure control valve disposed midway of said first conduit, for regulating pressure in said first conduit;

a second pressure control valve disposed midway of said second conduit, for regulating pressure in said second conduit; and a link mechanism for controlling said first and second pressure control valves simultaneously in linkage, to maintain a substantially constant difference in pressure between said first and second conduits, said link mechanism linking said first and second pressure control valves.

6. A laser beam machine including a laser for generating a laser beam, comprising:

a laser beam head;

an optical path cover through which said laser beam passes from said laser to said laser beam head;

an air separator for separating oxygen and nitrogen from compressed air;

first conduit means for introducing nitrogen-rich gas separated by said air separator into said optical path cover of the laser beam machine as a protective gas; and second conduit means for introducing the nitrogen-rich gas separated by said air separator into said laser beam head of the laser beam machine as an assist gas, said second conduit means comprising a conduit connected between said optical path cover and said laser beam head for supplying the nitrogen-rich gas into said laser beam head as the assist gas.

7. A laser beam machine including a laser for generating a laser beam, comprising:

a laser beam head;

an optical path cover through which said laser beam passes from said laser to said laser beam head;

an air separator for separating oxygen-rich gas and nitrogen-rich gas from compressed air;

conduit means for introducing said nitrogen-rich gas separated by said air separator into said laser beam head of the laser beam machine as an assist gas, said conduit means comprising:

a first conduit connected between a first outlet port of said air separator and said laser beam head, for discharging the nitrogen-rich gas;

a first change-over valve disposed midway of said first conduit, for supplying the nitrogen-rich gas into said laser beam head when opened;

a first pressure control valve disposed midway of said first conduit, for controlling pressure in said first conduit;

a second conduit connected between a second outlet port of said air separator and said laser beam head, for discharging said oxygen-rich gas;

a second change-over valve disposed midway of said second conduit, for supplying oxygen-rich gas into said laser beam head when opened;

a second pressure control valve disposed midway of said second conduit, for controlling pressure in said second conduit; and a control device that substantially constantly maintains the purity of the nitrogen-rich gas by maintaining a substantially constant difference in pressure between said first and second conduits.

8. The laser beam machine according to claim 7, wherein said optical path cover further comprises at least one mirror for reflecting said laser beam, and wherein said dry nitrogen-rich air is directly jetted against said at least one mirror.

* * * * *